Sept. 12, 1944.  F. D. CORNELL  2,358,000
DAIRY ESTABLISHMENT
Original Filed Feb. 1, 1937  8 Sheets-Sheet 3

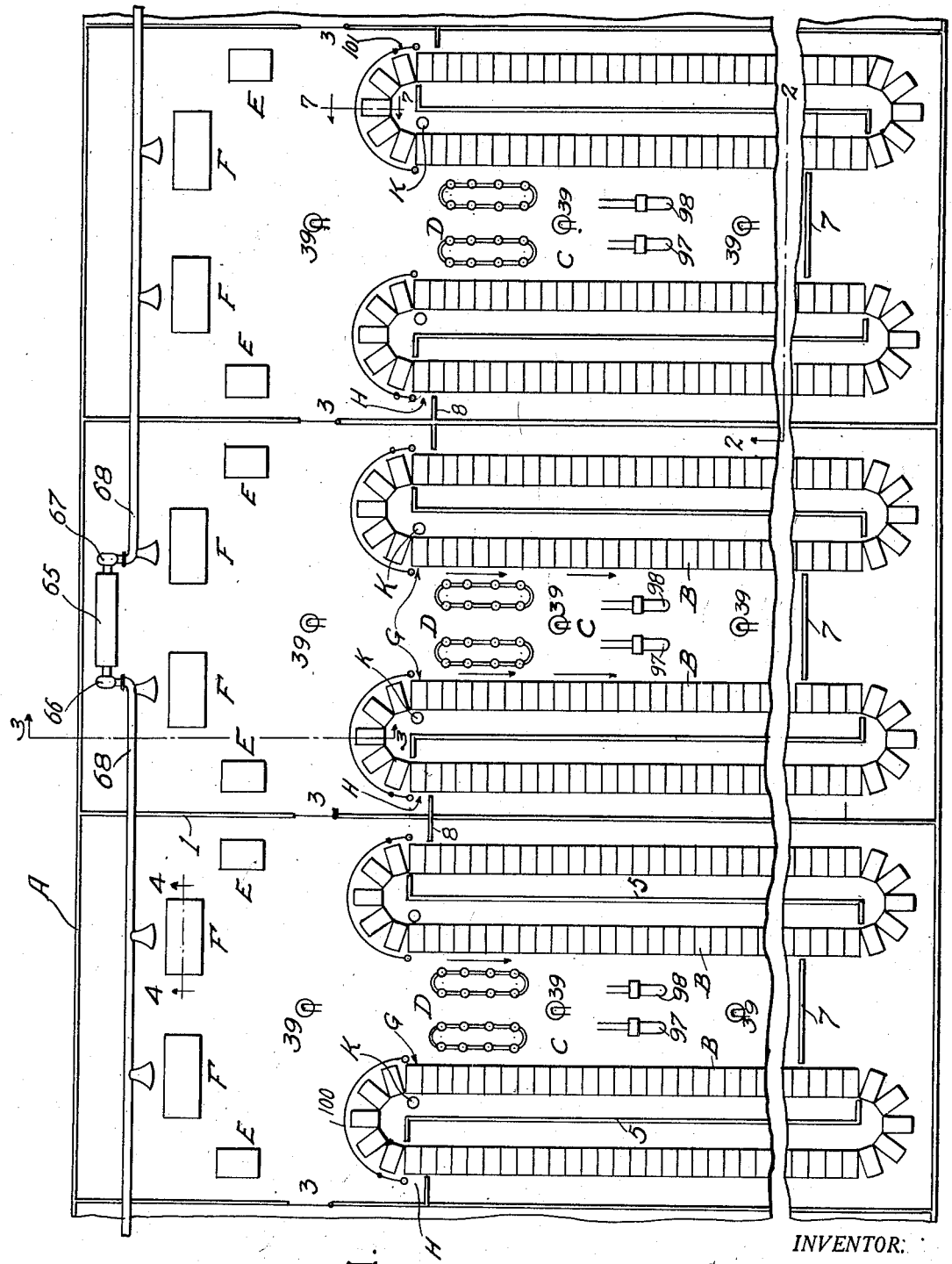

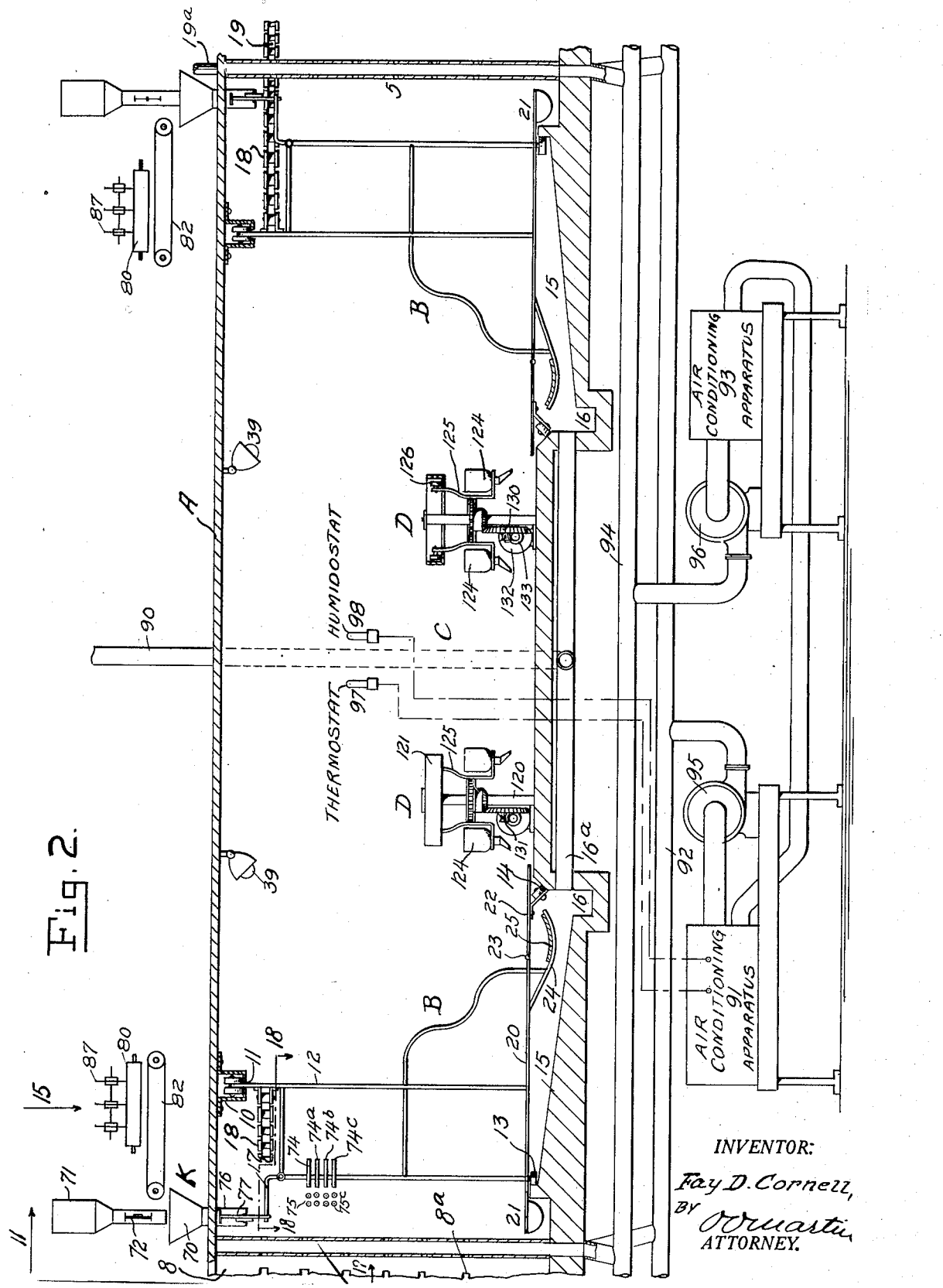

INVENTOR:
Fay D. Cornell,
BY
O O Martin
ATTORNEY.

Sept. 12, 1944. F. D. CORNELL 2,358,000
DAIRY ESTABLISHMENT
Original Filed Feb. 1, 1937 8 Sheets-Sheet 4
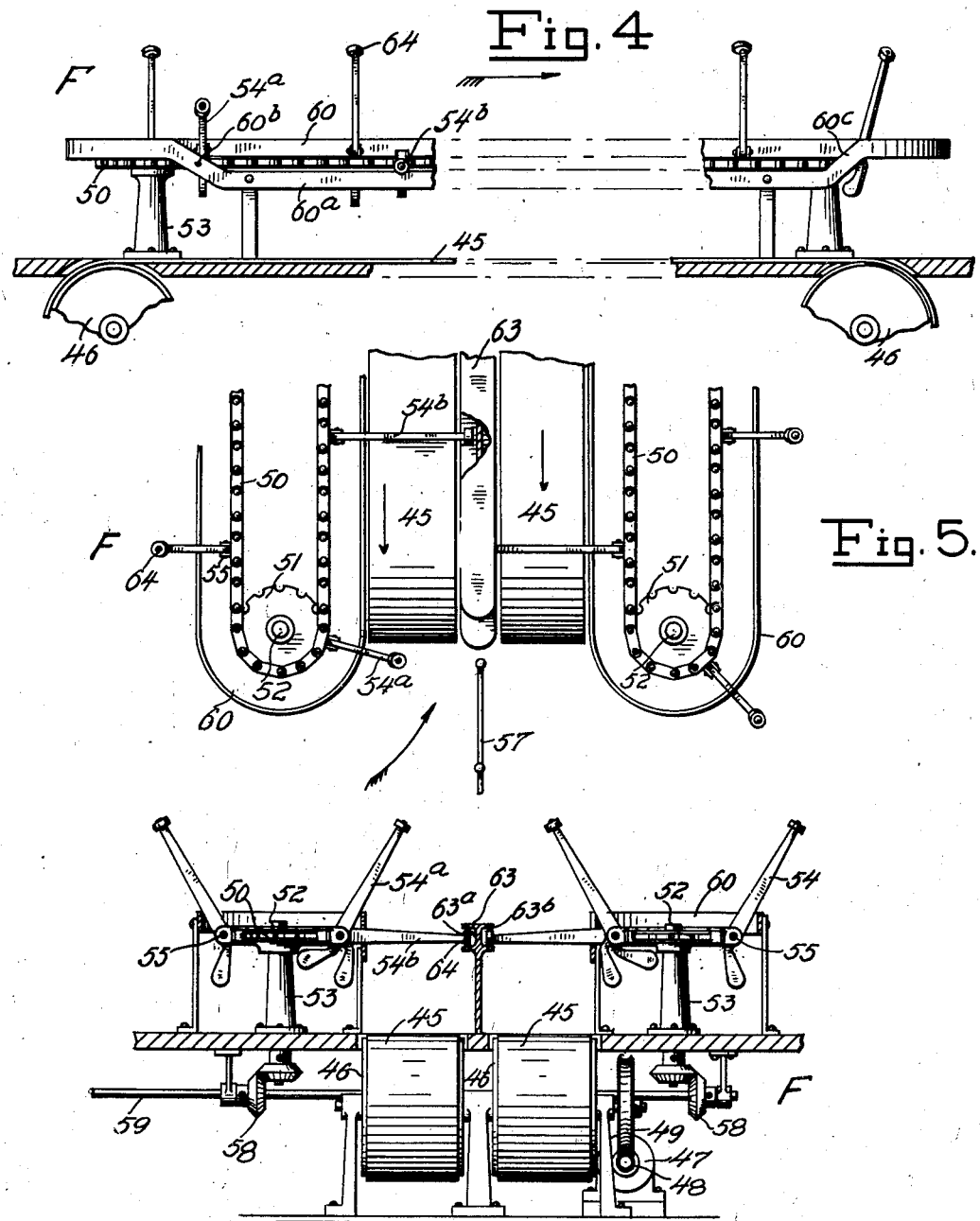
INVENTOR:
Fay D. Cornell,
BY O. O. Martin
ATTORNEY.

Sept. 12, 1944.  F. D. CORNELL  2,358,000
DAIRY ESTABLISHMENT
Original Filed Feb. 1, 1937   8 Sheets—Sheet 5

INVENTOR:
Fay. D. Cornell,
BY
O. O. Martin
ATTORNEY.

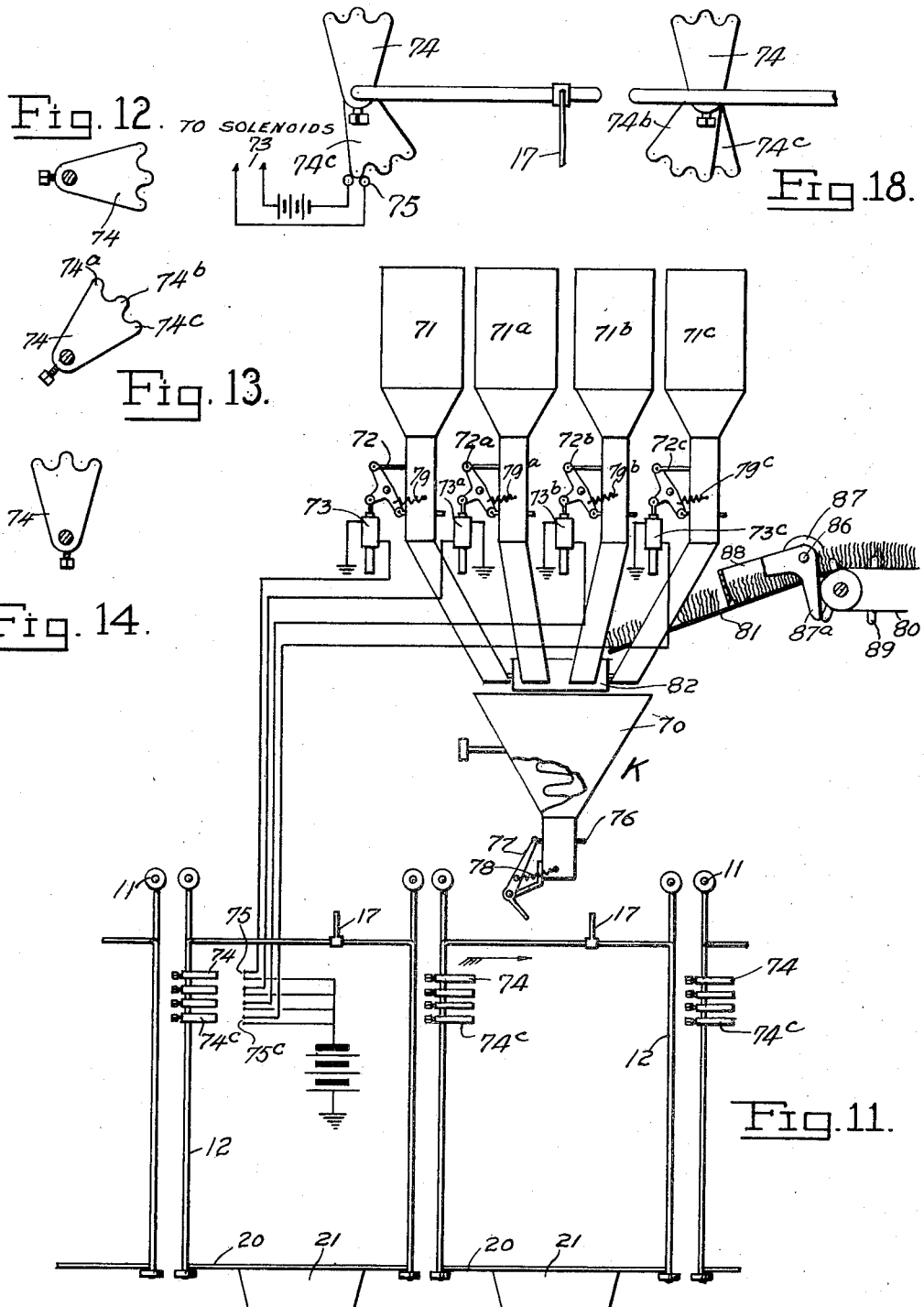

Sept. 12, 1944.　　　F. D. CORNELL　　　2,358,000
DAIRY ESTABLISHMENT
Original Filed Feb. 1, 1937　8 Sheets-Sheet 7
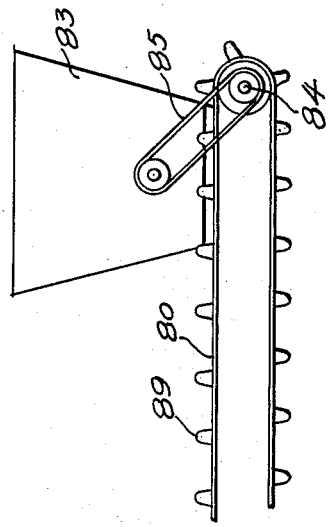
Fig. 16.
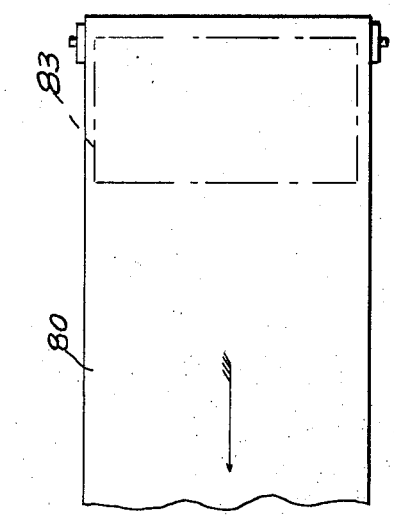
Fig. 15.
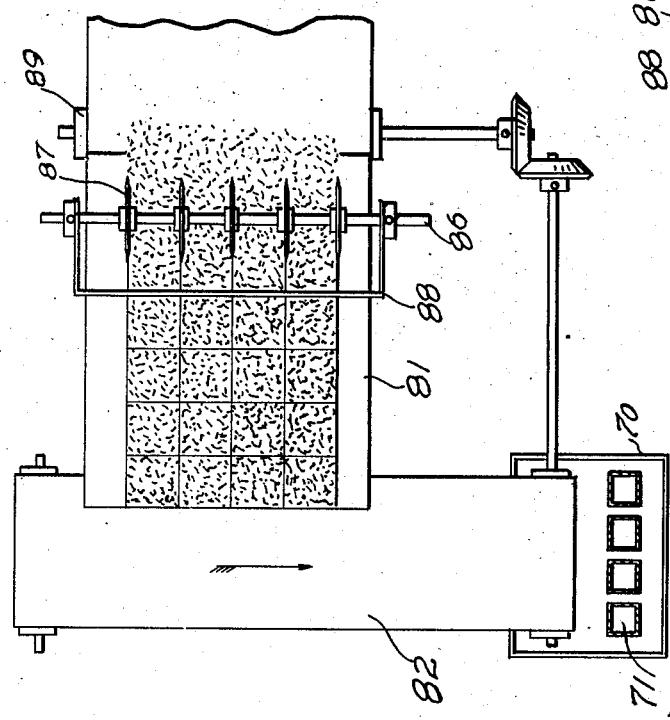
INVENTOR:
Fay D. Cornell
BY
O O Martin
ATTORNEY Sept. 12, 1944.  F. D. CORNELL  2,358,000
DAIRY ESTABLISHMENT
Original Filed Feb. 1, 1937   8 Sheets-Sheet 8

INVENTOR:
Fay D. Cornell,
BY
O O Martin
ATTORNEY

Patented Sept. 12, 1944

2,358,000

UNITED STATES PATENT OFFICE 2,358,000

DAIRY ESTABLISHMENT

Fay D. Cornell, San Gabriel, Calif.

Refiled for abandoned application Serial No. 123,401, February 1, 1937. This application October 20, 1942, Serial No. 462,773

23 Claims. (Cl. 31—58)

The trend of humanity toward the cities continues and the manner of agricultural pursuits is constantly changing in an effort to keep step with this movement, causing old methods to be abandoned and entirely new theories to be carried into practice.

This is particularly true in animal husbandry. Where formerly the farmer applied himself to general farming on a moderate scale to supply the wants of his household and dispose of the surplus at a nearby village or town, farming has now become highly specialized. The dairyman, for example, is no longer a farmer, but a milk producer. He may raise some of the feed, but it is becoming increasingly common, at least in the more progressive sections of the country, to concentrate entirely on milk production and to obtain feed products from outside sources. Pasturing is eliminated, as the dairy establishments move closer to the cities, and only an unsightly, unsanitary yard, or corral usually remains to remind of old-fashioned dairying.

It is the general object of the present invention to provide a sanitary, economic and convenient dairy establishment to suit present day urban requirements.

It is a further object of the invention to provide a dairy establishment in which special attention is automatically given to correct feeding of individual animals.

It is also an object of the invention to provide improved means for milking the cows within the establishment of the invention.

Another object is to provide means within the establishment designed properly to exercise the animals in a convenient, effective and pleasing manner.

A further object is to provide improved lighting arrangements within the establishment to the end that the animals may be afforded the light conditions best suited to keep them healthy and contented.

A further object is the provision of air conditioning devices calculated uniformly to maintain the best possible atmospheric conditions within the establishment.

A further object is the provision of improved means of sanitation designed to maintain the animals as well as the living quarters of the animals clean and fresh at all times.

A dairy establishment embodying the objects and advantageous features of the present invention is hereinafter fully described and illustrated in the appended drawings, of which:

Fig. 1 is a diagrammatic plan view disclosing the general arrangement of a dairy establishment embodying the invention;

Fig. 2 presents, on a larger scale, a sectional end elevation through one of the compartments of the establishment, and is taken substantially on line 2—2 of Fig. 1;

Fig. 3 is a substantially corresponding sectional side elevation of the front portion of the establishment taken substantially on line 3—3 of Fig. 1;

Fig. 3ª shows, on a larger scale, parts in the lower right corner of Fig. 3;

Fig. 4 is a fragmentary side elevation of the exercising device of the invention, taken on line 4—4 of Fig. 1;

Fig. 5 is a substantially corresponding plan view of one end of this device;

Fig. 6 is an end view of the exercising device substantially in agreement with Fig. 4;

Fig. 11 is a view, on a larger scale, diagrammatically showing some of the devices at the left of Fig. 2, as viewed in the direction of the arrow 11 without including such structural details as the floor and ceiling;

Figs. 12 to 14 are detail views of parts of Fig. 11;

Fig. 15 is an enlarged plan view of the feed dispensing devices at the upper left corner of Fig. 2, viewed in the direction of the arrow 15;

Fig. 16 is a side elevation of the same devices, substantially in agreement with Fig. 15;

Fig. 18 is a detail view taken substantially on line 18—18 of Fig. 2 in the direction indicated.

Figure 3A:
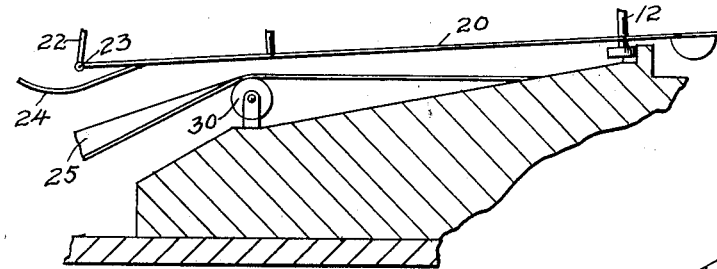

The device of the invention is contained within a light and air controlled building A and it comprises, generally, a series of endless conveyors, supporting stalls B for the animals, and these conveyors are suitably connected with a prime mover continuously to circulate said stalls. These stall conveyors are arranged in pairs, and between the conveyors of each pair is provided a work alley C, in which are placed smaller conveyors, or carriers D, designed to support milking equipment. It is to be noted that the reaches of the stall conveyors facing each work alley are designed to move along the alley in the same direction and at the same speed. Also that the reaches of the milk carriers adjacent to and facing the stalls move along therewith at the same speed. Near the end of each stall conveyor is mounted a wash rack E, and adjacent to each wash rack is placed an exercising device F. In addition, various devices are provided which are essential to the well being of the animals, all of which will be described in detail presently.

The method of operation of the device comprises leading the animals, each of which is numbered, one by one to the stalls B, at point G, the conveyor speed being so slow that ample time is given each cow to enter its numbered stall.

The milking machine carriers D are arranged to move at the same speed, thereby to enable the attendant to make necessary milking connections and again to effect disconnections before the end of the milk machine carriers is reached. The animals are, after leaving the milking zone, carried around on the conveyors to a point H, where arrangements are made to permit each animal to back out of its stall and to walk across the floor to the wash rack E.

The apparatus F consists of endless belts moving in the direction opposite to that in which each animal enters the device. The animals are compelled, due to the introduction of suitable barriers, to adjust their speed to that of the belts, the result being that, after a specified period of time, each animal steps off the opposite end of the belt and is free to walk forward to and to enter its stall at point G. Suitable drying equipment is provided thoroughly to dry the animals during the exercising period.

Within each conveyor, and directly in front of the cow entering its stall at G, is placed a feed dispensing apparatus K, which automatically delivers to the manger of each animal the proper quantity and mixture of feed, as prescribed and modified by the veterinary on duty, from time to time. Mechanism for this purpose is arranged above the conveyors and will be referred to in detail later.

As stated, the building is light and air controlled. To this end, partitions I are placed between adjacent pairs of conveyors to divide the building into entirely separated sections. Of course, doors, as indicated at 3, may be provided to afford convenient inter-communication but, when these doors are closed, no light or air communication is present. The front spaces of the building, in which the wash racks and exerciser-dryers are placed, are continuously lighted. But a series of partitions 5, 7, 8 are placed back of these spaces gradually to decrease the brightness of this light sufficiently to provide a night zone of suitable length.

It is customary, in larger dairies, to milk the cows two or three times a day. The intervening periods are occupied in eating, digesting and resting. Modern dairymen endeavor to perform the milking operations at regular, uniform intervals, but in this they are handicapped because the activities in most dairies are confined to the daytime and suspended during the night. The devices of my invention are designed to operate continuously and uniformly, and the result is that the cows are milked at certain stated uniform intervals. The stall conveyors make one complete circuit in the time from one milking to the next and the darkened period between successive milkings is animal's short night. A cow will quickly adjust herself to such regular periods and, because no lapses or delays are experienced, adopts the routine of her existence with contentment.

The conveyors of the invention are each, for the sake of clearness and simplicity, shown to comprise trolleys 11, which are fitted to ride within endless tracks. A post 12 is mounted on and extends downward from each trolley, and this post forms part of the frame work which maintains the stalls suspended from the trolleys. An endless chain 18, parts of which are shown in the drawings, is attached to the posts 12, near the top thereof, and each chain is driven by a sprocket wheel 19 which, in turn, is suitably connected for rotation by a prime mover at the proper speed. As such driving mechanism is commonly known and widely used, it is not thought necessary to make further mention thereof, and it is thought sufficient, in order not unnecessarily to complicate the drawings, in Fig. 2 merely to indicate this sprocket wheel, the shaft 19ª of which is seen rising behind the partition 5 at the upper right hand corner of this drawing. The stall floor is, at each end, shown made with guide wheels 13, 14 and these wheels ride on a track formed by the side walls of a stall pit 15 which slopes toward the bottom to form a gutter 16, and the latter is slightly inclined toward the front end of the section to drain off any liquid that may find its way therein.

The floor of the stall comprises a bed portion 20, the front end of which is shaped to receive a manger bracket 21. A rear extension 22 is pivotally secured to the bed portion at 23, and this rear portion carries the guide rollers 14. Beneath this rear extension projects a frame 24, on which a belt 25 is supported. The top surface of this frame is preferably concave and, as the belt conforms itself to this gutter-like shape, it is seen that any liquid or semiliquid which drops through the extension 22 and on to the belt, will be held by the belt and carried along until disposed of.

Figure 9:
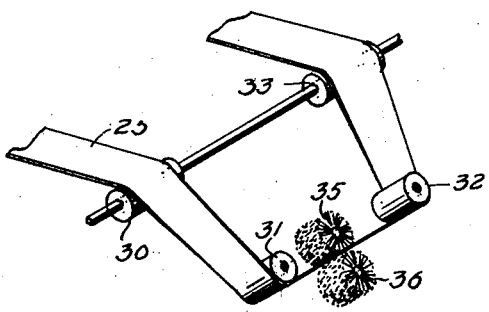
Fig. 9 is a fragmentary perspective view of certain cleaning devices hereinafter fully described.
Figure 8:
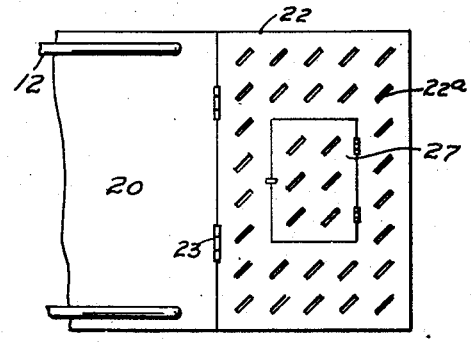
Fig. 8 is a plan view of a part of the stall structure of Fig. 7.
Figure 7:
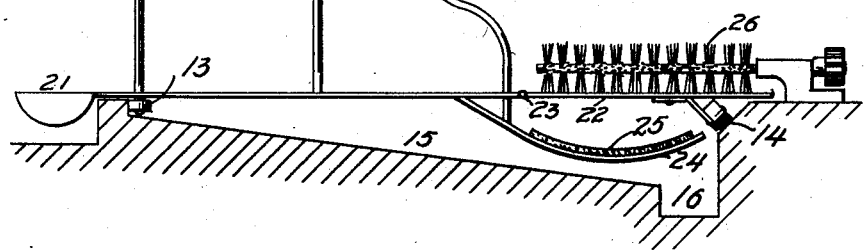
Fig. 7 is a fragmentary view of the cow stall construction and the cleaning devices therefor, taken substantially on line 7—7 of Fig. 1.

As stated, the cow leaves the stall at H and walks to the wash rack, but the stall continues to move forward, causing the extension 22 to reach and travel under scrubbing elements 26, thoroughly to cleanse its top surface, see Fig. 7. To this end, the shaft of the scrubbing element is shown fitted with a gear wheel which, in any suitable manner, is connected for rotation by the stall circulating mechanism. As the extension 22 serves as a bridge across which the animal passes in entering and leaving its stall, it is necessary that its surface is sufficiently complete to afford the animal sure footing. It is, however, made with perforations 22ª, as indicated in Fig. 8, through which all liquids may drain and with a trap door 27 for the disposal of more solid matters. The extension, being pivotally hung, may now be swung upward on its pivot for inspection and to facilitate drying. The belt continues to move forward, subsequently to pass over a series of rollers 30, 31, 32, 33, see Figs. 3 and 9, which guide the belt through a cleaning pit 34 and back on to the frames 24, before the point G is reached. To facilitate cleaning of the belt within the pit, suitable scrubbing elements 35, 36 may be provided. As the pits and the cleaning devices therein preferably are exactly alike at both ends of the gutters 16, the illustration of these devices in Figs. 3 and 3ª pertains to both ends.

Figure 3:
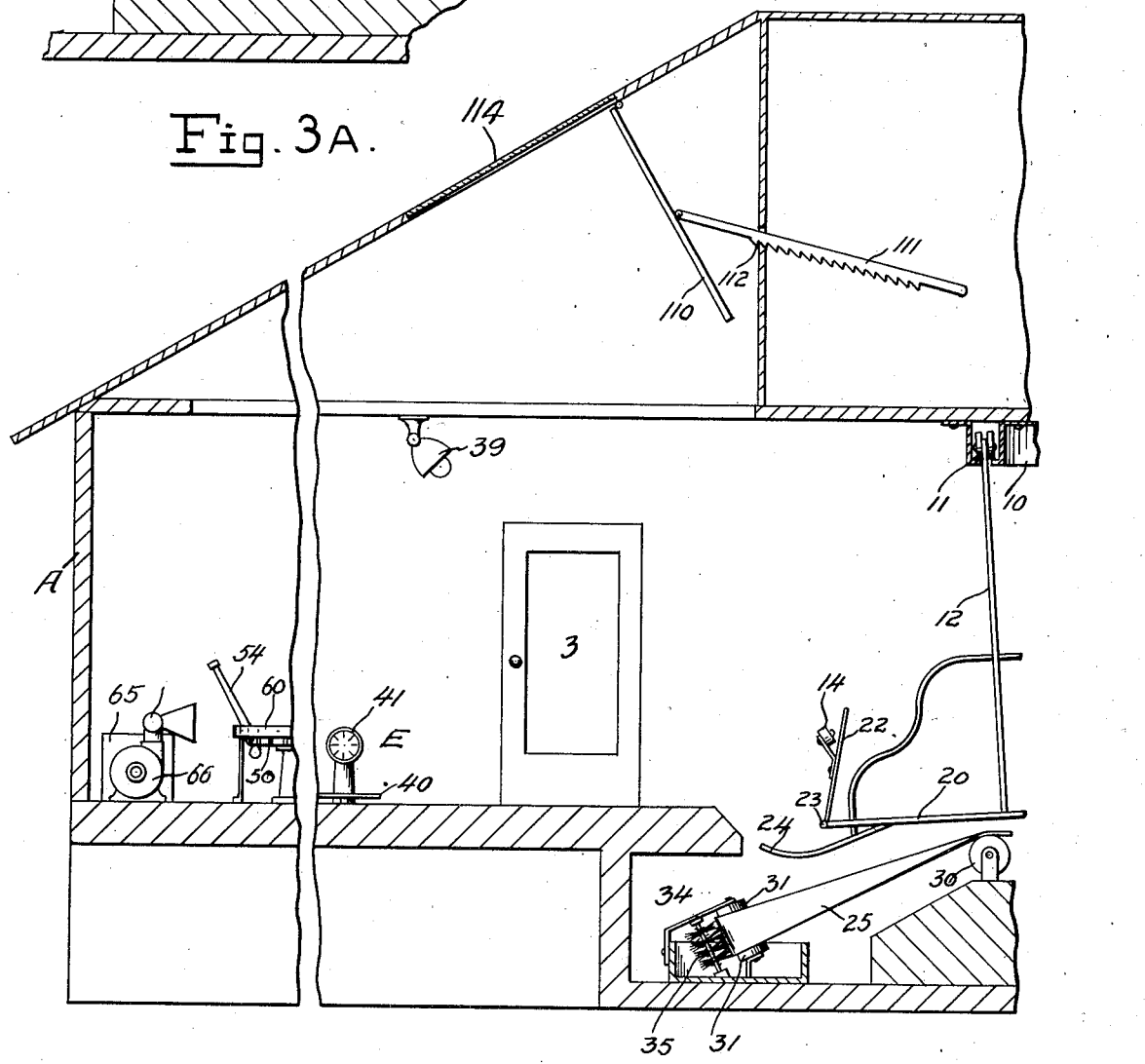

The wash rack may conveniently take the shape of a platform 40, forming part of a weighing apparatus 41, upon which the weight of each animal is recorded, see Fig. 3.

The exercising device of the invention is illustrated in Figs. 4, 5, and 6. As both ends of this device may be alike, only one end is shown in Fig. 5. The device comprises two endless belts 45, hung on pulleys 46 which are shown rotated at a predetermined speed through the medium of a motor 47 and intermediate gearing 48, 49.

At the side of each belt is horizontally placed a sprocket chain 50, supported on sprocket wheels 51 which, in turn, are fixed to rotate with shafts 52, and the latter are journaled in pedestals 53. A series of arms 54 is equidistantly mounted on each chain by means of special links 58, and these arms are caused to swing vertically to form gates for controlling the entrance to and exit from the exerciser.

In the arrangement illustrated in the drawings, seven cows are always out of the stalls. Disregarding for the sake of this description the time spent in walking from the stall to the wash rack, thence to the exerciser and back to the stalls, the devices are arranged to maintain six cows on the exerciser while one cow is being washed and weighed. The distance between the gate 54 should be sufficient to afford a cow ample room and the length of the exerciser is calculated to maintain three cows on each belt 45. From this, it is seen that each cow is held between two gates.

The chains 50 are, through the medium of gears 58 and a shaft 59, connected to be slowly driven in such timed relation to the movement of the stalls that each cow leaves the exerciser in time to reach and reenter her stall at station G. This may conveniently be effected by driving the exerciser directly from the stall conveyor in any suitable manner.

A horizontal track 60 is mounted to encompass each gate chain. Each track is made with an inside depressed portion 60$^a$, rising at each end on an easy incline 60$^b$, 60$^c$ to the main portion of the track. The gates are balanced to ride on these tracks which, due to this arrangement, control the opening and closing of the gates. In order better to explain this arrangement, let it be assumed that a cow, coming from the wash rack is directed to pass along the left side of a railing 57 and to enter the exerciser under the open gate 54$^a$. The cow will proceed forward until stopped by the closed gate 54$^b$, the forward movement of which the cow is free to follow. The gate 54$^a$ thereupon commences to slide down the track incline 60$^b$ into closed position on the track portion 60$^a$. The cow is now held between the two gates and is forced to advance with the gates. If at the same time the belt is caused to move at a desired speed in the opposite direction, it is seen that the animal can be made to walk along at the rate of speed found most beneficial. In due time, the gate 54$^b$ reaches and commences to rise along the incline 60$^c$, leaving the cow free to step out of the exerciser and to return to its stall.

Cows are similarly directed along the right belt of the exerciser, but the gates of the right side are arranged to travel half way between those of the left side in order that the entrance and exit of the cows may take place in equal alternate sequence.

A railing 63 is placed between the two belts to maintain the animals separated laterally, and this railing may conveniently be shaped to form channels 63$^a$, 63$^b$, designed to reduce friction between the gate arms and the channel sides.

The gate arms 54 are in the drawings shown fixed to swing upward into open position, mainly for the sake of clearness, but they may be made to swing downward, if so preferred, it being the purpose of this description merely to indicate means of guiding the animals through the exerciser.

The drying apparatus is, in Figs. 1 and 3, conventionally illustrated to comprise an air heating and conditioning device 65 and fans 66, 67 blowing dry, warm air through conduits 68 and their branches to the various exercising belts. The proper design and details of such drying apparatus should be readily executed by a competent engineer, there being nothing novel in such well known apparatus.

The proper feeding of dairy cows is most important, yet little attention is generally paid to this phase of the industry. The prevailing method is to dump a supposedly sufficient quantity of feed into each manger and to depend upon the cow to pick out such portions of the feed as may be required. This method is unsatisfactory because the animal may not be supplied the ingredients necessary to increase milk production, and it is expensive because a quantity of unconsumed feed goes to waste. The function of the veterinary on duty should be to study the condition and milk record of each cow and to prescribe the diet best suited to increase milk production. But, after all this has been done, it is necessary to provide means for carrying the dieting program into practice. This may be accomplished substantially in the manner diagrammatically indicated in Figs. 11 to 14.

Directly above the passing manger 21 is mounted a mixing chamber 70, see also Fig. 2, into which feed is passed from a series of superimposed hoppers 71, 71$^a$, 71$^b$, 71$^c$. One of these hoppers should be provided for each particular kind of feed prescribed, and each hopper is controlled by a double gate mechanism 72, 72$^a$, 72$^b$, 72$^c$, and these mechanisms are in turn connected for operation by solenoid magnets 73, 73$^a$, 73$^b$, 73$^c$. Suitably mounted on an upright member of the stalls is a series of rotatable arms 74, 74$^a$, 74$^b$, 74$^c$, which may be swung around to close a corresponding series of switches 75, 75$^a$, 75$^b$, 75$^c$. If, for example, the arm 74$^c$ is turned to close the switch 75$^c$, it is seen that the solenoid 73$^c$ becomes energized to close the upper gate of the mechanism 72$^c$ and to open the lower gate, thereby to permit a measured quantity of feed to drop from this hopper into the mixing chamber 70. The latter is shown controlled by a gate 76, and this gate is subsequently opened through the medium of an arm 17, of the stall frame, tipping a bellcrank 77 which, in turn, withdraws the gate. A spring 78 serves again to close the gate, and a series of springs 79, 79$^a$, 79$^b$, 79$^c$, are shown connected to reset the hopper gate mechanism 72. The feed delivered into the chamber 70 is mixed by means of suitable, well known devices which, for the sake of simplicity, in Fig. 11 are conventionally shown to comprise a screw 70$^a$, rotated by means of a stubshaft 70$^c$, having a pulley 70$^b$. The latter may by a belt be connected to any available source of motive power.

The quantity dispensed by the gate mechanism 72 constitutes a feed unit and, because it may be required to supply a cow more than one unit of some particular kind of feed, provision is made for energizing the solenoids a number of times in succession. This may be accomplished by providing the arms 74ª, 74ᵇ, 74ᶜ with a series of fingers, as indicated in Figs. 12 to 14. The position in which each arm is set controls the number of times the corresponding switch is closed and therefore the number of units dispensed from the hoppers, and it is seen that the dietician, by the proper adjustment of the arms 74 can supply the proper quantity of properly mixed feed to each animal. Water troughs should, of course, be suitably positioned along the line of the passing stalls.

In addition to the ordinary mixtures of feed passed through this dispensing device, it is also necessary to supply to the animals a certain amount of succulent feed, such as sprouted grain. Usually such green feed is manually delivered to the animals, but this method is unsanitary and costly, it takes up much room, and is uncertain because dependent entirely upon the judgment and alertness of the persons performing this manual task.

To overcome this difficulty, I provide means for delivering to mixing chamber 70 succulent feed in measured quantities and timed to permit each measured unit to reach the manger as it passes under the mixing chamber. Such means is here shown to comprise an endless belt 80 which may extend the entire length of the building, on the feed loft above each stall conveyor. This belt may be connected directly to the conveyor drive to be driven in timed relation to the movement of the stalls. It is shown positioned to deliver succulent feed across an inclined plate 81 to a smaller, transverse belt 82, and the latter discharges the feed into the mixing chamber 70.

Succulent sprouted grain feed may be bought in the open market, but it is considered most sanitary, advantageous and economical to sprout the grain at the place where it is used and in such qualities as may be required properly to feed the animals. Different methods are in vogue at the present time for sprouting the feed, any one of which may be here employed, the matter of interest to this application being that a definite length of time is required for the sprouted grain to reach the desired development of growth. This period of time may be ten days and is, for the purpose of this description assumed to be ten days.

Above the rear end of the belt 80 is shown placed a hopper 83, see Figs. 15 and 16, in which is installed mechanism for delivering grain to the belt as it may be required. As such seed dispensing devices are well known and commonly used in corn and grain planters, it is not thought necessary to burden this application with a detailed description. It is thought sufficient to show the dispensing hopper connected to be driven from the roller shaft 84, of the belt 80, by means of a chain 85.

The deposited grain now advances slowly and, in its course of advance is treated according to the methods of sprouting adopted, which method includes means for maintaining the grain moistened and perhaps the addition of particular chemical and light treatments.

Beyond the front end of the belt is shown mounted a shaft 86, to which a series of equidistant circular knives 87 is secured, which knives serve to slit the sprouted web into strips of uniform width. A transverse knife frame 88 is hung to oscillate on the shaft 86 for the purpose of cutting the strips of sprouted grain into squares of uniform size.

As the belt 80 advances, it is seen that line after line of these squares are pushed along the plate 81 to drop onto the belt 82, thereon to be carried to and one by one to be dropped into the mixing chamber 70.

If it is required to pass one square of sprouted feed through the mixing chamber each time a stall manger passes under this chamber, it is seen that the belt 82 should be driven from the stall conveyor at the proper relative speed. Also that the speed of the belt 80 must be calculated to drop each line of squares onto the belt 82 directly behind the previous line of squares which in the meanwhile has moved out of the way with the belt 82. And, if it takes ten days to sprout the grain, it is seen that the length of the belt 80 must be correspondingly calculated in order to afford the sprouts sufficient time to develop. It is also seen that the length of the belt has a fixed relation to its width. If, for example, the belt is 400 feet long and has a capacity of four squares in each line, it is seen that the length of the belt may be decreased to 200 feet by widening the belt to add four more squares to each transverse line of squares.

Since the belt moves very slowly and because the knife frame should drop reasonably fast in order cleanly to sever the strips of sprouts, it may be well to provide suitable tripping means. Such means is here, for the sake of simplicity, shown to comprise equidistant projections 89, of the belt 80, engaging a pendent arm 87ª of the knife frame. Such arrangement permits this frame to rise slowly and, upon its release, to drop suddenly through the soft sprouts.

The milking operation is performed while the cow busies herself with the fresh, palatable feed. It is not thought herein necessary to dwell in detail upon the construction of the milking apparatus, milking machines being so well known and so commonly used in the dairy industry. Suffice it to say, that the machines are spaced on the carriers D to correspond with the distance between the stalls. A numbered milk container may be supplied for each cow and attached to the machine approaching the stall of the corresponding number. After the milking is completed, this container is suitably transferred to a central weighing analyzing and recording room (not shown), and the cow passes through the daylight zone.

Figure 10:
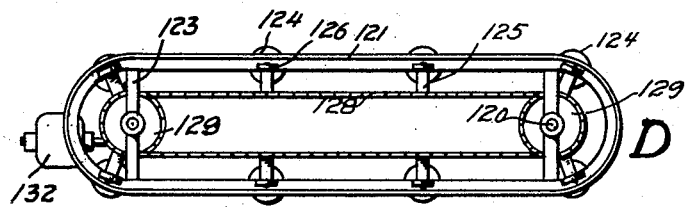
Fig. 10 is a detail plan view of certain parts of Fig. 2.

Such milking machine combination is shown in Figs. 2 and 10 to comprise a pair of posts 120, rising from the floor to support an endless track 121 by suitable means, such as horizontal beams 123. A series of milking machines 124 is mounted on brackets 125, which latter are fitted with wheels 126, riding in the track 121. An endless sprocket chain 128 is, by means of special links, secured to the brackets 125, and sprocket wheels 129, mounted to rotate on the posts 120, are positioned to engage this chain.

On the hub of one of these sprocket wheels are cut teeth for engagement by a bevel gear 130, and a worm gear 131 is mounted to rotate with this bevel gear. A motor 132 is suitably placed on the floor and it is fitted with a worm 133, in mesh with said worm wheel. In such manner, it is possible to rotate the milking machines at the proper speed. But, in actual practice, it may be found advantageous to connect the milking machine carrier for direct operation by the stall conveyor.

Or, according to another well known practice, weighing mechanism may be installed at the end of the carrier for weighing the milk from each cow before it passes from the milking machine and into a common container or into a conduit leading into a store room. In the latter case, a sample of the milk from each cow is first taken for analyzing and recording purposes.

It was above stated, that the cows, from the milking period, continue to pass through the daylight zone and then into the night zone. Modern science teaches that the animals are greatly benefited by exposure to light rays of certain frequencies and equipment is now commercially available for supplying the rays most beneficial to milch cows continuously maintained indoors. Such equipment is employed in the system of my invention, and it is in the drawings represented by a plurality of electric light bulbs 39, suitably arranged within the daylight zone.

It is also considered beneficial, in present day practice, intermittently to expose the animals to currents of ionized air. To this end, an improved system of ventilation is provided, as will now be described in detail. The partitions 5 are shown extending from the transverse partitions 8 all the way to the rear end of the stall conveyors. The partitions 5, 7 and 8 extend from floor to ceiling, they are shown hollow, and the long partitions 5 are, by means of spacers 6 (see Fig. 17) divided into a plurality of sections 5b. In the walls of each section are provided openings, or louvers 5c and 8a, through which an air current is caused to flow into the spaces occupied by the stalls. In the side walls of the stall pit gutters 16 are placed conduits 16a, (see Fig. 2) communicating with vent pipes 90, through which the air coming from the louvers is drawn. When these pipes are made to extend through the roof of the building, natural air suction should be sufficient to draw off the air as fast as it is supplied through the louvers, but fans may, of course, be employed if preferred. In such manner, it is seen that ionized air can be supplied at predetermined points and confined to limited zones.

Figure 17:
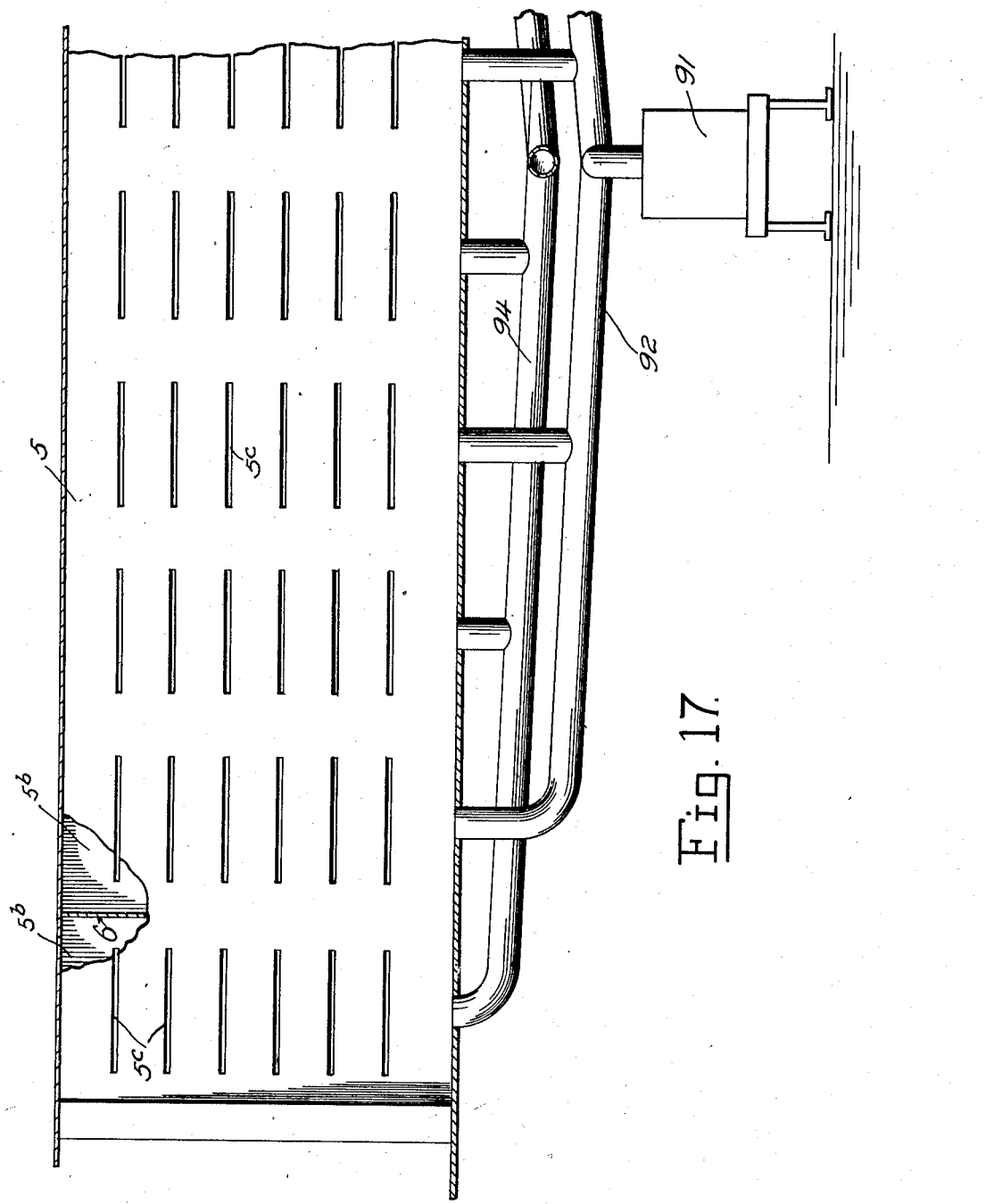
Fig. 17 is an elevational view of portions of the air conditioning devices of the invention substantially as they would appear when viewed along the arrow 17 of Fig. 2.

As conventionally indicated in Figs. 2 and 17, an air conditioning device 91 is employed, and this device is, by means of conduits 92, connected to supply air to some of the partition sections 5b. A device 93, in which air drawn from the air conditioning device 91 becomes ionized, is connected, through the medium of conduits 94, to deliver ionized air to other sections 5b. Fans 95, 96 may conveniently be added to force the air through the various conduits and sections at a proper, predetermined speed.

In such manner, it is seen that a sufficient flow of clean, temperature and humidity controlled air may be continuously distributed through the building. Also that ionized air may intermittently be supplied to such an extent and limited to such spaces as the results of scientific research may dictate. By placing temperature responsive bulbs 97 and humidity responsive bulbs 98 at suitable points and properly connecting such bulbs with the air conditioner, automatic control may be obtained.

A railing 100, (see Fig. 1), should be placed around the end of the conveyor to prevent the animals from reentering the stalls until the station G is reached and, if a gate 101 is provided in this railing, it is seen that the cow may be released manually and permitted to pass out of this gate, should a stanchion for some reason fail to open or the cow in some manner become entangled.

The belt 25 continues to move forward at station H, as was explained above, but the stalls commence to make the end turn. When the frames 24 are made concave to form the belt into gutter shape, it is seen that an interference will occur at this point. In order to make certain that this will not happen, it is well to tilt the stalls slightly while passing around the end curve. To this end, the floor wall, against which the rollers 12 ride is, in Fig. 3a, shown recessed. In such manner, it is possible to tilt the stall frames, substantially as indicated, while the stalls make the end turns, thereby to clear the belt and to permit it to ride over the guide rollers into the cleaning pits which are located at each end of the conveyors.

While the building is and must be light and air controlled, it may be found advantageous to make use of such natural sunlight as may be available. To this end, it is possible to provide along the south wall, which encloses the daylight portion of the building, or in the roof above this wall, a series of shutters 110 and mechanism for operating such shutters. For the sake of simplicity of description and illustration, the operating mechanism for each shutter is merely shown to comprise a notched bar 111, which extends into the feed loft of the building for manual operation and a toothed edge 112, of the loft wall, for engagement by the notches of the bar. A window pane 114 is shown fitted into the opening served by the shutter 110.

The foregoing is directed to the description of a dairy establishment, but it is not my intention to limit the invention to dairy cow management. It should be expressly understood, that the system of my invention is equally applicable to the housing of other animals, such as baby beef, hogs and sheep. The milking apparatus may, in such cases, be dispensed with, but otherwise the general combination may remain substantially as described.

In the case of hogs and sheep, it may be preferred to house more than one animal in each stall, otherwise no substantial modification in the stall construction should be required.

I claim:

1. In a light and air controlled space, means dividing the space into a lighted and a darkened zone, endless conveyors continuously and uniformly moving through said zones, cow stalls provided with mangers and carried by said conveyors, feed dispensing apparatus in the lighted zone, selecting devices on the stalls, means controlled by said selecting devices for discharging feed from said apparatus into each manger, milking machine carriers movable in the lighted zone along the stalls, and means for moving the adjacent reaches of said conveyors and carriers in the same direction at the same speed.

2. In a dairy building, an elongated conveyor continuously and uniformly moving horizontally, means for moving said conveyor, cow stalls hung on said conveyor, each stall made with an extension, an endless belt resting on said extensions and continuing beyond both ends of the conveyor, a pit at each conveyor end, rollers mounted in said pits for guiding said belt from the end of the conveyor through the pit and again back on to the conveyor, and belt cleaning apparatus within the pits.

3. In a dairy building, an elongated conveyor continuously and uniformly moving horizontally, means for moving said conveyor, cow stalls hung on said conveyor, a concave extension bracket on each stall, an endless belt resting on said extensions to form gutters extending beyond the ends of the conveyor, a pit at each conveyor end, and means within the pits for guiding the belt from the conveyor through the pits and back on to the extension brackets, the stall suspension means being arranged to cause the stalls to tilt as they reach the conveyor ends thereby to lower said extension brackets sufficiently to clear the belt as it passes beyond the conveyor.

4. In a light and air controlled dairy space, an elongated endless conveyor continuously and uniformly moving horizontally, means for moving said conveyor, a pit at each conveyor end, a gutter along each side of the conveyor discharging into said pits, stalls held suspended from the conveyor and extending across said gutters there to form concave brackets, an endless belt resting on said concave brackets to form troughs above the gutters, means within said pits for guiding the belt into the pits and back on to said extensions, means for continuously supplying fresh air to the space about the stalls, means for automatically controlling the temperature and humidity of the air supplied, and means leading from said gutters for carrying off the air supplied to said space.

5. In a light and air controlled dairy space, an elongated endless conveyor continuously and uniformly moving horizontally, means for moving said conveyor, a pit at each end of the conveyor, a gutter along each side of the conveyor discharging into said pits, stalls held suspended from the conveyor and extending across said gutters, hollow partitions arranged to divide the space occupied by the conveyor into a continuously lighted and a continuously darkened zone, means for continuously supplying temperature and humidity controlled air to said partitions and out through slots in the partitions, and vents leading from said gutters to carry the air circulating through the stalls from said louvers out of the building.

6. In a dairy building, the combination with an endless conveyor horizontally movable in the building, of cow stalls held suspended from the conveyor, a station for admitting cows to the stalls, a station for the cows to leave the stalls, a washing and weighing device, an exercising device, both arranged in the space intermediate said stations, said exercising device comprising a continuously moving floor, means maintaining the cows walking across said floor in the direction opposite to that of the floor movement in separated relation and at the same time timing the forward movement of the cows, and means for moving said endless conveyor, said floor and the said separating means in timed relation to each other.

7. In a dairy building, an endless conveyor, animal carriers hung on said conveyor, feed troughs on said carriers, means for sprouting feed, means for dividing said feed into rations, means for delivering rations to said troughs, and means on said carriers for controlling the delivery of said feed rations.

8. In a dairy building, an endless conveyor fitted to carry animals, means for delivering feed to the animals carried by the conveyor, said means comprising, a mixing chamber above the path of travel of the animals, hoppers for delivering feeds of various kinds to said chamber, means for sprouting feed, means for carrying said sprouted feed to the mixing chamber, and means on the conveyor for controlling the kind and quantity of feed delivered to the animals on the conveyor.

9. In a dairy building, an endless conveyor, stalls on said conveyor, a manger on each stall, feed dispensing means above said conveyor, discharge control means for said dispensing means, means for sprouting grain, means for dividing the sprouted grain into a continuous series of portions, means for continuously moving said conveyor and the said sprouting means at a slow uniform speed to cause a sprouted portion to drop into the dispensing means each time a manger passes below said dispensing means, and means on each stall for actuating said control means to open said dispensing means to discharge feed into each of said mangers.

10. In a dairy building, endless conveying means, stalls carried by said means, a manger on each stall, a feed chamber above the stalls, discharge control means for said chamber, endless conveying means adjacent to said chamber adapted to receive grain for sprouting, means associated with said grain conveying means for dividing sprouted grain into portions, means for conveying the sprouted grain portions one by one to said feed chamber, means for continuously moving all these conveying means at slow uniform speed, and means on each stall for actuating said discharge control means to discharge a sprouted grain portion into each of said mangers.

11. In a dairy building, an endless conveyor horizontally movable, stalls hung on said conveyor, each stall having a rear extension, gutters in the floor of the building extending around the conveyor below the stall extensions and terminating and draining into pits, means for cleaning said stall extensions, means for continuously moving said conveyor at slow uniform speed, and means for guiding the moving stalls at the bottom.

12. In a dairy building, an endless conveyor horizontally movable, stalls on said conveyor, gutters in the floor of the building extending around the conveyor below the rear end of said stalls and draining into pits, the floor sloping from the front end of the stalls into said gutters, means for cleaning the rear portion of the moving stalls, and means for continuously moving said conveyor with the said stalls.

13. In a dairy building, an endless conveyor mounted for continuous uniform movement, stalls carried by said conveyor, a manger on each stall, feed dispensing means, and means operatively connecting each stall with said dispensing means at predetermined points along the line of travel of the stalls to transfer feed from said dispensing means to each of said mangers.

14. In a dairy building, a conveyor mounted for movement therein, stalls carried by said conveyor, a manger on each stall, normally closed feed dispensing means, discharge control means for said dispensing means, and means on each stall for actuating said control means selectively to open said dispensing means to discharge feed for delivery into each of said mangers.

15. In a dairy building, two conveyors arranged in parallel relation to each other to form a common work alley there between, cow stalls carried on said conveyors, milking machine carriers mounted in said work alley adjacent to the two conveyors, and means for continuously moving the said conveyors and the said carriers at the same speed and so that the adjacent reaches of the conveyors and carriers move in the same direction.

16. In a dairy building, a pair of endless conveyors arranged in parallel relation to each other to form a common work alley therebetween, cow stalls mounted on said conveyors, milking machine carriers within said alley in parallel relation to the conveyors, and means for continuously moving said conveyors and the said carriers at the same speed and so that the adjacent reaches of the conveyors and carriers move in the same direction, said carriers being fitted to receive milking machines.

17. In a light and air controlled building, means dividing the building into lighted and darkened zones, cow washing stations and cow drying means within said lighted zone, cow exercising means within the lighted zone, two endless conveyors movable through said lighted and darkened zones, there being a common work alley between said conveyors in said lighted zone, cow stalls mounted to move with said conveyors, stations in the lighted zone for releasing and again admitting the cows to the stalls which they previously occupied, milking machine carriers in said common work alley, and means for moving the adjacent reaches of said conveyors and the said carriers in the same direction and at the same speed.

18. In a dairy building, an endless conveyor, means for continuously and uniformly moving said conveyor, stalls carried by the conveyor, a manger on each stall, a mixing chamber above the conveyor, means normally maintaining said chamber closed, means on each stall for automatically opening said closing means to discharge feed into the manger on the passing stall, a series of feed hoppers above said mixing chamber, discharge means for said hoppers, and means on each stall for actuating said hopper discharge means selectively to open said hoppers to discharge feed into the mixing chamber.

19. In a dairy building, an endless conveyor, stalls on said conveyor, exit and entrance stations from and to the stalls of the conveyor, an exerciser between said stations comprising a floor continuously moving in the direction opposite to the passage of the animals from the stalls through the exerciser and back to the stalls, and means maintaining the animals separated while passing through the exerciser, timed to retain each animal therein until the stall from which the animal departed reaches said entrance station.

20. In a dairy building, means circulating in the building and equipped to support dairy animals, entrance and exit stations for the animals to and from said means, exercising devices for the animals intermediate said stations, gates on said exercising devices for admitting and discharging the animals, and means timed with the movement of said circulating support means for opening and closing said gates.

21. In an establishment for housing animals having a level floor formed to provide an endless track, animal supports, means for circulating said supports along said track, stations arranged a distance apart along the outer edge of said track to form passages for animals from the supports to the floor and back to the supports, and cleaning means mounted on the floor outside said supports to project over the outer portion thereof intermediate said stations for cleaning this portion of the supports while the animals are absent therefrom.

22. In an establishment for housing animals, an endless conveyor, animal supports carried by said conveyor, means for continuously moving said conveyor to circulate the said supports, a guard placed outside said supports along a portion of the path of travel thereof, passages at the ends of said guard for animals from and back to the supports, exercising devices intermediate said passages for receiving animals coming from the supports, means for temporarily confining the animals within said devices, and means for operating the opening and closing of said confining means in timed relation to the support movement.

23. In an establishment for housing animals, an elongated endless conveyor, means for circulating said conveyor, animal supports on the conveyor, a guard enclosing the supports at one end of the conveyor, passages at the ends of said guard for animals from and back to the supports, animal exercisers outside said guard intermediate said passages, means temporarily confining the animals within said exercisers after leaving the supports, and means for operating said confining means in timed relation to the travel of the supports to release each animal in time to reach said return passage as the support of this animal reaches the passage.

FAY D. CORNELL.